United States Patent [19]  
Hosokawa

[11] Patent Number: 4,615,640  
[45] Date of Patent: Oct. 7, 1986

[54] DEVICE FOR CONNECTING A WHEEL-LIKE BODY TO A SHAFT

[75] Inventor: Toshihiro Hosokawa, Osaka, Japan

[73] Assignee: Tsubakimoto Chain Co., Japan

[21] Appl. No.: 708,294

[22] Filed: Mar. 5, 1985

[30] Foreign Application Priority Data

May 31, 1983 [JP] Japan .................... 58-81235

[51] Int. Cl.⁴ .............................................. F16B 2/14
[52] U.S. Cl. .................... 403/369; 403/370; 403/372
[58] Field of Search ............ 403/370, 371, 372, 350, 403/351, 369, 342, 374

[56] References Cited

U.S. PATENT DOCUMENTS

| | | | |
|---|---|---|---|
| 3,501,183 | 3/1970 | Stratienko | 403/370 |
| 4,345,851 | 8/1982 | Soussloff | 403/369 |
| 4,367,053 | 1/1983 | Stratienko et al. | 403/374 |
| 4,388,014 | 6/1983 | Wlodkowski et al. | 403/374 |

Primary Examiner—Cornelius J. Husar  
Assistant Examiner—Peter M. Cuomo  
Attorney, Agent, or Firm—Steele, Gould & Fried

[57] ABSTRACT

A device for connecting a wheel or wheel-like body to a shaft has tapered inner and outer wedge rings that can be formed over one another using a captive nut. An expanded inner ring has axial slits and fits over the shaft. The inner ring has a tapered outer peripheral surface portion and a threaded cylindrical portion extending along the shaft. An expandable outer ring has a plurality of part-cylindrical segments and can be inserted between the inner ring and the wall of an axial bore in the wheel or wheel-like body. The outer ring has a tapered inner surface which is complementary to the tapered outer surface of the inner ring. The outer ring has a first annular groove formed in its inner peripheral surface adjacent to its minimum inside diameter end and a second annular groove formed in its outer peripheral surface. The segments are held together by a retaining ring fitted in the second annular groove of the outer ring. A nut adapted for threaded engagement about the threaded surface of the inner ring is captive on the outer ring due to an annular projection which is engageable in the first annular groove of the outer ring, whereby the nut will lock or positively disengage the device even using a low taper angle.

12 Claims, 4 Drawing Figures

DEVICE FOR CONNECTING A WHEEL-LIKE BODY TO A SHAFT

BACKGROUND OF THE INVENTION

1. Field of the Invention

This invention relates to a device for connecting a wheel or wheel-like body to a shaft, and more particularly to a device which can rigidly connect a body to a shaft at any axial and rotational position on the shaft with a high accuracy of centering. The body and shaft are connected by tightening a nut, and the body is positively disconnected from the shaft when the nut is loosened.

2. Description of the Prior Art

A known device for connecting a wheel to a shaft is shown in FIG. 1. The wheel 2, for example a gear, has a hub 3. The hub 3 has an axial bore through which a rotary shaft 1 extends. The prior art device includes an inner ring 5 fitted about the shaft 1. The bore in the hub has an enlarged diameter portion 4 in which the inner ring 5 is fitted. The inner ring 5 has a slit 6 extending along its entire length, allowing it to expand and contract in circumference. The inner ring 5 has an outer periphery with a tapered portion 7 located within the enlarged diameter portion 4 of the hub and a threaded portion 8 located outwardly of the hub. The device also includes an outer ring 10 having an axial slit 9. The outer ring 10 is fitted in the enlarged diameter portion 4 and has a tapered inner peripheral surface 11 which is complementary to the tapered portion 7 of the inner ring 5. A lock washer 12 is positioned in contact with the outward end of the outer ring 10 and has an inner edge projection 13 engaged in the slit 6. A nut 14 is threadedly engaged about the threaded portion 8 of the inner ring 5. An opposing wedge action is developed by the tapered surfaces 7 and 11 when the nut 14 is tightened. The relative axial displacement of the inner and outer rings 5 and 10 forces into intimate contact with the shaft 1 and the peripheral wall of the enlarged diameter portion 4 of the bore in the wheel 2, respectively, whereby the wheel 2 is secured to the shaft 1. The washer 12 also has an outer edge projection folded over the nut 14.

The prior art device does not include any mechanism enabling forced disengagement of the rings 5 and 10. It is, therefore, necessary that the tapered surfaces 7 and 11 have a sufficiently large taper angle to inherently urge the outer ring 10 outwardly along the shaft, thereby to release its wedge action when the nut 14 is loosened.

As a matter of geometry, the wedge taper results in a definite relationship between axial displacement of the wedge rings and the resulting radial displacement or force. Rotation of nut 14 forces axial displacement of rings 5 and 10 in an amount determined by the pitch of the thread. The axial displacement of rings 5 and 10 results in a corresponding radial displacement of outer ring 10 in an amount determined by the tangent of the taper angle. The pitch and taper angle also determine the degree of force exerted radially as a result of a given torque on the nut, in the same way. For purposes of illustration, the prior art device shown in FIG. 1 has a taper angle of about 16 degrees. The device of the invention as illustrated in FIGS. 2-4 has a taper angle, for example, of less than 1/5 that of the device of FIG. 1, about three degrees.

The relatively large taper angle needed to release wedge ring 10 has a number of disadvantages. Firstly, the device fails to produce a sufficiently large force for securing the wheel to the shaft, because the available torque for tightening nut 14 is opposed by the steeply-tapered surfaces 7, 11. Secondly, as a result of the steep taper angle, each of the inner and outer rings 5 and 10 have a relatively short axial length. Inasmuch as the wheel 2 is ultimately supported along the short axial length of the taper rings, it is not possible to dependably achieve and hold a high accuracy of centering for the wheel 2 relative to the shaft 1. As a result, the wheel 2 must frequently be provided with an additional centering guide surface 15, spaced from the wedge structure and functioning like an outrigger to limit the centering error. Thirdly, the washer 12 or like means is essential for locking the nut 14 in its tightened position against the force of the steeply-tapered wedges so that the nut cannot be loosened by vibration.

SUMMARY OF THE INVENTION

It is an object of this invention to eliminate drawbacks of the prior art including those pointed out above, and to provide an improved device which can conveniently, effectively and accurately be used for connecting a wheel to a shaft.

This object is attained by a device for connecting a body having an axial bore, to a shaft, comprising an inner ring having a plurality of axial slits, adapted to be placed along the shaft, the inner ring including a tapered portion having a tapered outer peripheral surface tapering to a cylindrical portion extending from the minimum outside diameter end of the tapered portion, the cylindrical portion having a threaded outer peripheral surface, an axially split outer ring defined by a plurality of part-cylindrical segments, the outer ring being adapted for insertion between the inner ring and a peripheral wall of the axial bore in the wheel and having a tapered inner peripheral surface which is complementary to the tapered outer peripheral surface of the inner ring, the outer ring having a first annular groove formed in its inner peripheral surface adjacent to the minimum inside diameter end of the tapered inner peripheral surface and a second annular groove formed in its outer peripheral surface, the outer ring segments being held together by an annular spring fitted in the second annular groove, and a clamping nut adapted for threaded engagement about the threaded outer peripheral surface of the inner ring and having an annular projection which is engageable in the first annular groove of the outer ring, the clamping nut being thereby held captive with the outer ring.

BRIEF DESCRIPTION OF THE DRAWINGS

There are shown in the drawings the embodiments that are presently preferred. It should be understood, however, that the invention is not limited to the precise arrangements and instrumentalities illustrated in the drawings.

FIG. 2; and

DETAILED DESCRIPTION OF THE PREFERRED EMBODIMENT

Figure 2:
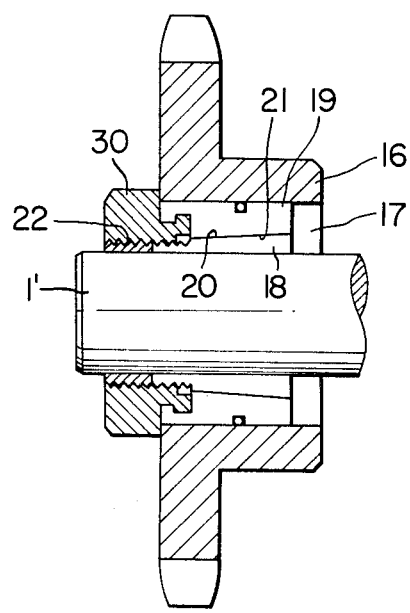
FIG. 2 is a longitudinal sectional view of a device according to the invention.
Figure 3:
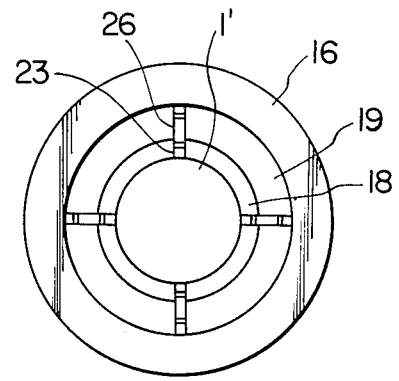
FIG. 3 is a right side elevational view of the device shown in FIG.
Figure 4:
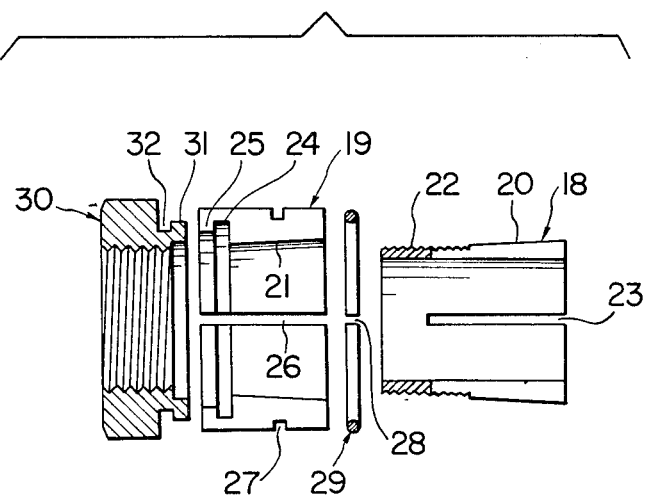
FIG. 4 is an exploded longitudinal sectional view of the connecting device shown in FIG. 2.

A device embodying this invention is shown by way of example in FIGS. 2 to 4 and adapted for connecting a wheel having a hub 16 to a shaft 1' which extends through the axial bore 17 of the hub 16. The device comprises an inner ring 18 fitted about the shaft 1' and including a tapered portion having a tapered outer peripheral surface 20, and an outer ring 19 fitted in the bore 17 between the hub 16 and the inner ring 18 and having a tapered inner peripheral surface 21 which is complementary to the outer tapered surface 20 of the inner ring 18.

The inner ring 18 includes an externally threaded cylindrical portion 22 extending from the minimum outside diameter end of its tapered portion outwardly of the wheel or boss 16. The inner ring 18 has a plurality of spaced axial slits 23 extending from the maximum outside diameter end of the tapered portion to a point intermediate the ends of the threaded portion 22, at the minimum diameter end of the tapered portion. The slits 23 are preferably equally spaced around the circumference, and allow the ring to expand or contract in circumference upon expansion or contraction of the slits, respectively. Contraction of ring 18 ensures the intimate contact of the inner ring 18 with the shaft 1', for a rigid connection thereof.

The outer ring 19 has an annular groove 24 formed in its inner peripheral surface 21 adjacent to its minimum inside diameter end. The groove 24 defines an annular projection 25 on its opposite side from the tapered surface 21. The outer ring 19 preferably consists of four segments of a cylinder split axially, and has, therefore, four axial slits 26 separating the segments from one another. These slits allow the outer ring 19 to expand and contract as the tapered part of inner ring 18 does. Expansion of slits 26 causes ring 19 to bear radially outwards against the walls of the axial bore 17 in hub 16. The outer ring 19 has an annular groove 27 formed in its outer peripheral surface and a retaining ring 29 fitted in the groove 27 for holding the outer ring segments together and normally urging them inward. The retaining ring 29 is split at 28 and therefore also can expand and contract.

The device further includes a nut 30 which is threadedly engageable with the threaded portion 22 of the inner ring 18. The nut 30 has on one side thereof a radially outwardly extending annular projection 31 and an annular groove 32 adjacent projection 31. The projection 31 is engageable with the groove 24 of the outer ring 19; and the projection 25 of the outer ring 19 is engageable with the groove 32, so that the outer ring 19 and the nut 30 may be axially connected together to form a unitary assembly. The nut 30 and outer ring 19 are axially captive but can be relatively rotated. The nut 30 has a hexagonal outer periphery for engagement with a wrench.

When the device is used for connecting a wheel or the like to the shaft 1', the outer ring 19 is expanded radially outwardly against the force of the ring 29 until projection 31 can be moved past projection 25, whereupon the projection 31 of the nut 30 is engaged in the groove 24; and the projection 25 is engaged in groove 32. The outer ring 19 and the now-captive nut 30 are fitted on the inner ring 18, inserted about the shaft 1', and the nut 30 is threadedly connected with the threaded portion 22 of the inner ring 18. The respective parts are dimensioned such that when the nut 30 and threaded portion 22 are initially engaged, the tapered surfaces 20 and 21 are not yet forcibly engaged. The outer ring 19 has a smaller outside diameter due to the constricting action of the spring 29 and can, therefore, be easily inserted into the bore of the hub 16. As the nut 30 and threaded portion 22 are threaded further, the outer ring 19 and inner ring 18 are displaced relative to one another axially, thereby increasing engagement between the tapered surfaces 20 and 21. Tightening nut 30 thus expands the outer ring 19 radially outwardly against the surface of bore 17 of hub 16, and contracts inner ring 18 radially inwardly against the shaft, whereby the wheel is secured to the shaft 1'. The nut 30 has an outside diameter which is larger than the diameter of the bore 17, and is normally tightened causing the nut to abut on the peripheral edge of the bore 17 as shown in FIG. 2.

The nut 30 can be turned in the opposite direction to positively disconnect the wheel or like body from the shaft 1'. Inasmuch as the nut 30 is axially captive by the engagement of projection 31 to the outer ring 19, loosening rotation of the nut 30 not only relieves axial force, but also positively causes relative axial displacement of the inner ring 18 and outer ring 19, pulling the rings away from tight engagement with one another so that the wheel is freed of the connecting device and may be removed from the shaft 1'. The arrangement according to the invention thus defines a mechanism for the forced disengagement of the inner and outer rings 18 and 19.

Figure 1:
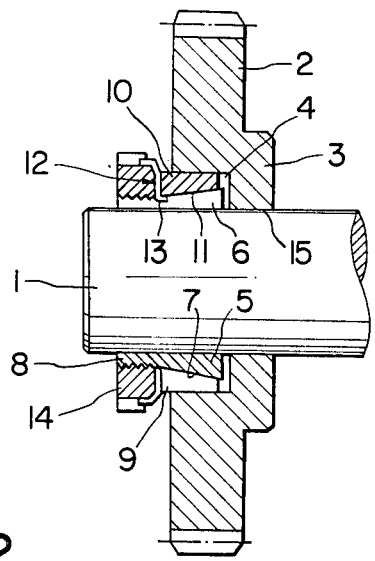
FIG. 1 is a longitudinal sectional view of a device known in the art, for purposes of comparison.

According to this invention, the feature of forced disengagement of the inner and outer rings enables dimensioning of their tapered surfaces to be axially elongated and to define a small taper angle. Accordingly, the threaded rotation of the nut over a given angle causes an axial displacement of rings 18, 19 as in the prior art, but a relatively greater degree of radial force outwardly on the wheel. The device can nevertheless be disengaged easily. In this manner, a given maximum torque on the nut is made effective to produce better radial force against the hub. The nut is easier to turn than in a more-steeply tapered device because the low angle of taper results in a mechanical advantage. Moreover, in addition to the ability to create a sufficiently large force for securing the wheel to the shaft, the device of the invention increases axial length of the engaging parts which ensures a high accuracy of centering for the wheel relative to the shaft, without need for an outrigger-type supporting surface as shown in FIG. 1. The connection of the nut to the outer ring by their annular projection and groove inherently prevents any loosening of the nut by, for example, vibration, whereby a lockwasher is not essential. The slits of the inner and outer rings and the particular taper and interconnections allow the rotation of the nut to develop a large tightening force relative to the shaft and the wheel respectively. These and other advantages which will be clear to persons skilled in the art make this invention of high industrial utility.

Variations on the embodiments shown and discussed will also be apparent to skilled persons in light of this disclosure. Reference should be made to the appended claims to discern the true scope of the invention.

What is claimed is:

1. A device for connecting a body to a shaft, the body having a bore defining an axis for the shaft, the device comprising:

an inner ring having a plurality of axial slits for allowing expansion and contraction of said ring, adapted to be placed along the shaft and including a tapered portion having a tapered outer peripheral surface tapering to cylindrical portion extending from a minimum outside diameter end of said tapered portion, the cylindrical portion having a threaded outer peripheral surface;

an axially-split outer ring defined by a plurality of part-cylindrical segments for allowing expansion and contraction of said ring, the outer ring being adapted for insertion between said inner ring and a peripheral wall of the axial bore in the body and having a tapered inner peripheral surface which is complementary to said tapered outer peripheral surface of said inner ring, said outer ring having a first annular groove formed in said inner peripheral surface adjacent to a minimum inside diameter end thereof and a second annular groove formed in its outer peripheral surface, said segments being held together by a retaining ring fitted in said second annular groove; and a nut adapted for threaded engagement about said threaded surface of said inner ring and having an annular projection which is engageable in said first annular groove, the nut being relatively rotatable but axially captive on the outer ring whereby engagement of the outer ring from the inside by said nut allows expansion of said outer ring.

2. The device of claim 1, wherein the body is a wheel.

3. The device of claim 1, wherein the nut has an annular groove on an outer surface thereof, and the outer ring has an inwardly-directed annular projection, the inwardly-directed projection fitting in the annular groove of the nut.

4. The device of claim 1, wherein the nut has an outside diameter larger than the axial bore in the body, the nut positionable to abut the body.

5. The device of claim 1, wherein the retaining ring is a split spring.

6. The device of claim 1, wherein the complementary tapered inner and outer peripheral surfaces are tapered at less than six degrees relative to the axis.

7. The device of claim 6, wherein the tapered inner and outer peripheral surfaces are tapered at about three degrees relative to the axis.

8. The device of claim 1, wherein the axial slits of the inner ring extend to an intermediate point on the threaded portion at the minimum outside diameter end of the tapered portion.

9. The device of claim 1, wherein the axial bore is of equal diameter through the body.

10. The device of claim 9, wherein the inner and outer rings are axially elongated.

11. A device for connecting a body to a shaft, the body having a bore defining an axis for the shaft, the device comprising:

an inner ring having a plurality of axial slits for allowing expansion and contraction of said ring, contraction of said inner ring causing close contact of said ring with said shaft; said inner ring being adapted to be placed along the shaft and including a tapered portion having a tapered outer peripheral surface tapering to a cylindrical portion extending from a minimum outside diameter end of said tapered portion, the cylindrical portion having a threaded outer peripheral surface;

an axially-split outer ring defined by a plurality of part-cylindrical segments for allowing said outer ring to expand and contract, the outer ring being adapted for insertion between said inner ring and a peripheral wall of the axial bore in the body and having a tapered inner peripheral surface which is complementary to said tapered outer peripheral surface of said inner ring, said outer ring having a first annular groove formed in said inner peripheral surface adjacent to a minimum inside diameter end thereof and a second annular groove formed in its outer peripheral surface, said segments being held together by a retaining spring fitted in said second annular groove; and a nut adapted for threaded engagement about said threaded surface of said inner ring and having an annular projection which is engageable in said first annular groove upon expansion of said outer ring, said nut being relatively rotatable but axially captive on the outer ring so that loosening rotation of said nut causes relative axial displacement of the inner and outer ring, and tightening rotation expands the outer ring radially outwardly and the inner ring contracts radially inwardly.

12. The device according to claim 11 wherein said retaining spring is split for contraction and expansion of said spring.

* * * * *